No. 769,512. PATENTED SEPT. 6, 1904.
H. P. TIPPETT.
POP SAFETY VALVE.
APPLICATION FILED MAR. 12, 1904.
NO MODEL.
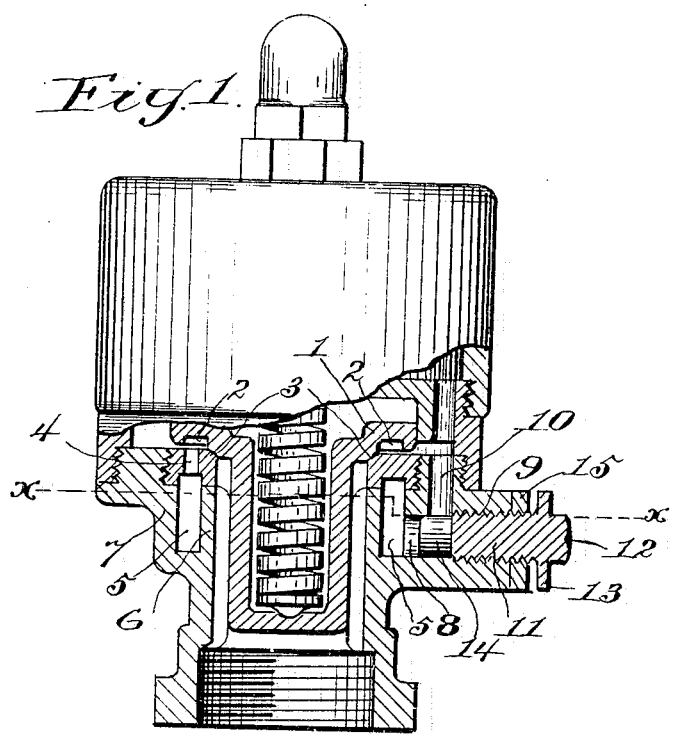
Fig. 1.
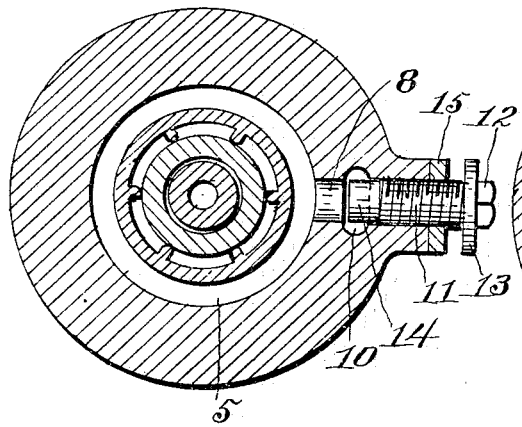
Fig. 2.
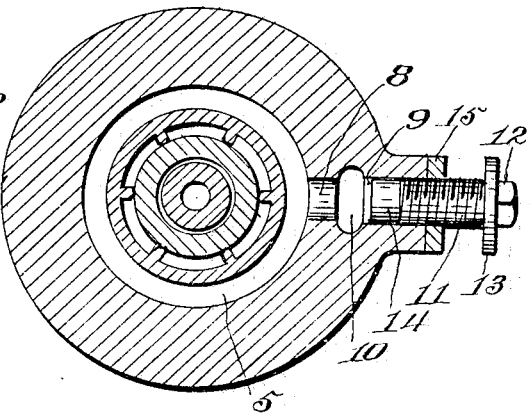
Fig. 3.
Witnesses
L. E. Money
N. H. Whitman
Inventor
Harold P. Tippett
By
Attorney No. 769,512. Patented September 6, 1904.

UNITED STATES PATENT OFFICE.

HAROLD P. TIPPETT, OF COLUMBUS, OHIO, ASSIGNOR TO THE N. L. HAYDEN MANUFACTURING CO., OF COLUMBUS, OHIO.

POP SAFETY-VALVE.

SPECIFICATION forming part of Letters Patent No. 769,512, dated September 6, 1904.

Application filed March 12, 1904. Serial No. 197,796. (No model.)

*To all whom it may concern:*

Be it known that I, HAROLD P. TIPPETT, a citizen of the United States, residing at Columbus, in the county of Franklin and State of Ohio, have invented certain new and useful Improvements in Pop Safety-Valves, of which the following is a specification.

This invention relates to safety-valves, and pertains especially to the class of pop safety-valves for locomotives and stationary engines having no pop adjusting-rings.

The prime object of the invention is to provide means in pop safety-valves exclusive of adjusting-rings and hollow screw-plugs to reduce the loss of boiler-pressure in the "blowback" of the valve to regulate the exhaust from the pop-chamber, so that the slightest escape of steam therefrom may prevail, be entirely closed off, or be wholly opened, as desired or as occasion may demand.

The object further of the invention is to provide a pop safety-valve having an annular port under its seat, from which port communication is made through a series of holes or apertures extending from the top of the seat to said port, a transverse port extending from the annular port, a port perpendicular to the transverse port, and a screw plug or valve to open and close communication between the last-mentioned ports.

In this class of valves where no pop adjusting-rings or equivalent means are employed there has been used a hollow screw-plug having an aperture to register with a duct leading from the pop-chamber. It has been found impossible to adjust the hollow plug to produce a throttle or choke of the duct to a small degree without closing it, and when the duct is open full its capacity as a port is inadequate for the demands of such valves. The full movement of the hollow apertured plug is one-fourth of a turn. Hence to divide the amount of turn to a degree giving a minute opening of the duct would be impractical. It is therefore the purpose of this invention to overcome and obviate the disadvantages and objections found in such valves and to furnish a valve cheap of construction, yet of such arrangement that improved results are attainable therein advantageous to the trade to which the invention pertains.

In the accompanying drawings, forming part of this application, Figure 1 is a sectional elevation of a pop safety-valve embodying my invention. Fig. 2 is a cross-section on the line *x x*, Fig. 1, showing transverse port slightly open. Fig. 3 is a similar view showing communication between transverse and perpendicular ports open.

The same numeral references denote the same parts throughout the several views of the drawings.

The valve here illustrated being one of the well-known pop safety-valves, the same will not be described in detail except as far as my invention relates thereto.

The valve 1 has a pop-chamber 2, and from the top of the valve-seat 3 are made holes or apertures 4, extending into an annular port 5, formed in the valve-body 6 under the seat and extending thereinto to meet the holes 4. Through the vertical wall 7 of the valve-body is formed a transverse port 8 from the port 5 central with a plug-bore 9 and flush with the bottom of the port 5. Extending perpendicular to the port 8 through the valve-body and terminating at the top flush with the top of the valve-seat 3 adjacent the pop-chamber 2 is a port 10, the lower terminal of which is flush with the plug-bore 9. The bore 9 has an internal screw-thread to receive a solid imperforate screw plug or valve 11, having a nut-head 12 and a flange 13 exterior of the valve. The inner end of the plug is reduced to the size of the port 8 and terminating in a circumferential bearing 14, adapted to work under the port 10 and into the port 8 and to form a turnable stopper for the port 8. The bearing 14 has a flat face against which the exhaust is made. A suitable lock-nut 15 is provided to hold the plug in adjusted position. It will be seen that an eighth or quarter of a turn given the plug will effect an opening between the transverse and perpendicular ports of a small degree, that the degree of opening may be even further diminished without closing the same, and that when the plug is unscrewed sufficient to bring its inner end flush with the plug-bore the whole capacity of the said two ports is made available.

Although I have shown and described my invention as applied to a locomotive pop-valve it may be just as conveniently applied to such valves for stationary engines. Hence I do not limit myself in the application thereof nor to any particular size or material of the plug nor one having a nut-head and lock-nut, as other equivalent means may be employed for holding the plug in adjusted position.

Having thus described my invention, what I claim as new, and desire to secure by Letters Patent, is—

1. The combination, with a pop safety-valve having exhaust-ports, of an imperforate screw-plug terminating in a circumferential screwless bearing working under one of the ports and extending into another of the ports to form a stopper for the latter port and to open and close communication between the ports.

2. The combination, with a pop safety-valve, and an annular wall separating two of the valve-ports and having a port leading from one to the other of said two ports, of a solid screw-plug terminating in a screwless bearing working in the said wall-port to vary the passage between the said two ports.

3. The combination, with a pop safety-valve having exhaust-ports, and an annular wall separating the ports and having a port therethrough, of a solid screw-plug terminating in a reduced threadless bearing fitting the said wall-port and having a flat face against which the exhaust is made.

4. In a pop safety-valve, the combination, with the valve-body having an annular port, the valve-seat having port-holes opening from the annular port through the top of the valve-seat, a transverse port leading from the annular port, and a port perpendicular to the transverse port, of a screw-plug terminating in an inner screwless end working through the perpendicular port and fitting the transverse port to open and close the latter.

In witness whereof I hereunto set my hand in the presence of two witnesses.

HAROLD P. TIPPETT.

Witnesses:
 FOSTER COPELAND,
 NORMAN L. HAYDEN.